US008638560B2

(12) United States Patent
Seo et al.

(10) Patent No.: US 8,638,560 B2
(45) Date of Patent: Jan. 28, 2014

(54) SLIDING APPARATUS FOR DOUBLE SLIDE-TYPE PORTABLE COMMUNICATION DEVICE HAVING LOCKING UNIT

(75) Inventors: Jeong-Hun Seo, Gyeonggi-do (KR); Jee-Young Jung, Seoul (KR); Sung-Ho Ahn, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 219 days.

(21) Appl. No.: 12/850,684

(22) Filed: Aug. 5, 2010

(65) Prior Publication Data

US 2011/0096480 A1  Apr. 28, 2011

(30) Foreign Application Priority Data

Oct. 22, 2009 (KR) .................. 10-2009-0100656

(51) Int. Cl.
*H05K 5/03* (2006.01)
(52) U.S. Cl.
USPC .................. 361/724; 361/679.55; 455/575.4
(58) Field of Classification Search
USPC ............... 361/679.01, 679.02, 679.55–58, 361/724–727; 455/575.1–575.4; 379/433.11–433.13
See application file for complete search history.

(56) References Cited

U.S. PATENT DOCUMENTS

| | | | |
|---|---|---|---|
| 7,831,286 B2* | 11/2010 | Cho et al. | 455/575.4 |
| 2007/0293286 A1* | 12/2007 | Park et al. | 455/575.1 |
| 2008/0167098 A1* | 7/2008 | Mizuta et al. | 455/575.4 |

FOREIGN PATENT DOCUMENTS

KR  2008-77865  8/2008  ............... H04B 1/38

* cited by examiner

*Primary Examiner* — Jinhee Lee
*Assistant Examiner* — Ingrid Wright
(74) *Attorney, Agent, or Firm* — Cha & Reiter, LLC.

(57) ABSTRACT

A sliding apparatus for a dual slide-type portable communication device, which includes a locking unit selectively formed in sliding members and configured to restrict movement of a first sliding member in a direction substantially perpendicular to a lengthwise direction of a body housing when the first sliding member is slid in a lengthwise direction of the body housing and to restrict movement of the first and second sliding members when the first and second sliding members are slid in a direction substantially perpendicular to a lengthwise direction of the body housing. The body housing and a sliding housing configured to be slid on the body housing in a lengthwise direction of the body housing or in a direction substantially perpendicular to the lengthwise direction of the body housing.

8 Claims, 11 Drawing Sheets

SLIDING APPARATUS FOR DOUBLE SLIDE-TYPE PORTABLE COMMUNICATION DEVICE HAVING LOCKING UNIT

CLAIM OF PRIORITY

This application claims the benefit of priority under 35 U.S.C. §119 from an application entitled "Sliding Apparatus for Double Slide Portable Communication Device Having Locking Unit" filed in the Korean Intellectual Property Office on Oct. 22, 2009 and assigned Serial No. 10-2009-0100656, the contents of which are hereby incorporated by reference in its entirety.

BACKGROUND OF THE INVENTION

1. Field of the Invention

The present invention relates to a sliding apparatus for a dual slide type portable communication device. More particularly, the present invention relates to portable communication devices having a structure in which two housings are slid relative to each other while continuously facing each other, and ways to reduce the thickness of the two housings themselves.

2. Description of the Related Art

Portable communication devices generally refer to devices that provide wireless communication between users or between a user and a service provider through a communication devices that are able to be transported while operating. Portable communication devices, in particular more recently developed devices of which also provide a plurality of different types of service contents such as voice communication services, transmission of text messages, mobile banking, watching TV, listening to music, online gaming, and video on demand (VoD) to a user.

Portable communication devices are typically classified into: 1) bar type terminals in which input/output units such as a communication circuit, a transmitter, and a receiver are carried by one housing; 2) flip type terminals in which a flip cover is installed in a bar type terminal; 3) and folder type terminals which are opened or closed when a pair of housings are pivoted and in which input/output units are distributed in the housings. In recent years, slide-type terminals have been in the process of being developed together with folder type terminals in order to satisfy various needs of users while improving portability and convenience for use.

Although mobile communication services were once limited to voice communications and text messages at the beginning of the development of portable communication devices, the field of use of such devices are being expanded to include transmission of games, music, moving image files, online gaming, and multimedia services, just to name a few examples of new services.

The variety of mobile communication service contents acts to vary functions of portable communication devices in conjunction with the variety of designs of portable communication devices. Therefore, input/output devices by which various functions can be sufficiently utilized are added to portable communication devices.

However, since most conventional slide-type portable communication devices have a structure in which two housings are slid relative to each other while continuously facing each other, the overall thickness of such terminals becomes larger due to the thicknesses of the two housings themselves, making a low profile very difficult to achieve.

In order to solve the above-discussed problem, a dual slide-type portable communication device is disclosed in detail in Korean Patent No. 616197.

As illustrated in FIGS. 1 and 2, the conventional dual slide-type portable communication device 10 includes a body housing 20, and a sliding housing 30 coupled to the body housing 20 such that the sliding housing 30 can be slid in a lengthwise (longitudinal) direction thereof and in a (transverse) direction of the body housing 20 substantially perpendicular to the lengthwise direction. A sliding module 40 of the dual slide-type portable communication device includes a base member 41 coupled to the body housing 20, a first sliding member 42 stacked on the base member 41 and configured for sliding the sliding housing 30 from the body housing 20 in a lengthwise direction thereof, and a second sliding member 43 stacked on the first sliding member 42, coupled to the sliding housing 30, and configured to slide the sliding housing 30 from the body housing 20 in a direction thereof substantially perpendicular to the lengthwise direction.

The sliding housing 30 includes the upper and lower housings 31 and 32.

However, the conventional dual slide-type portable communication device sometimes malfunctions due to the sliding movement of the sliding housing 30 in a direction substantially perpendicular to a longitudinal direction of the body housing when the sliding housing is slid in a lengthwise direction of the body housing or due to sliding movement of the sliding housing in a longitudinal direction of the body housing when the sliding housing is slid in a direction substantially perpendicular to a lengthwise direction of the body housing When a separate locking unit is mounted to the sliding apparatus of the dual slide-type portable communication device in order to solve the above-described problem, the thickness of the sliding module becomes larger, making it difficult for the portable communication device to have a small size and a low profile and increasing the number of assembling processes and manufacturing costs due to increase in the number of parts.

Therefore, there is a need for a locking unit that prevents movement of a sliding housing in a direction substantially perpendicular to a lengthwise direction of a body housing when the sliding housing is slid in a direction lengthwise direction of the body housing, and to prevent movement of the sliding housing in a lengthwise direction of the body housing when the sliding housing is slid in a direction substantially perpendicular to a lengthwise direction of the body housing.

SUMMARY OF THE INVENTION

Accordingly, the present invention has been made to provide a sliding apparatus for a dual slide-type portable communication device that as a result of the invention, can be made in reduced-size and having a lower profile, and can reduce manufacturing costs and the number of assembling processes by reducing the number of parts.

According to an exemplary aspect of the present invention, by integrally forming with a sliding member a locking unit configured to restrict movement of the sliding member in a direction substantially perpendicular to a lengthwise direction of the portable communication device when the sliding member is slid in a lengthwise direction of the portable communication device, and to restrict movement of the sliding member in a lengthwise direction of the portable communication device when the sliding member is slid in a direction substantially perpendicular to a lengthwise direction of the portable communication device.

In accordance with an exemplary embodiment of the present invention, there is provided a sliding apparatus for a dual slide type portable communication device, which includes a body housing and a sliding housing configured to be slid on the body housing in a lengthwise direction of the body housing or in a direction substantially perpendicular to the lengthwise direction of the body housing, preferably including: a first sliding member; a second sliding member stacked on the first sliding member and configured to slide the first sliding member in a lengthwise direction of the body housing; a third sliding member stacked on the second sliding member and configured to slide the first and second sliding members together in a direction substantially perpendicular to a lengthwise direction of the body housing; and a locking unit selectively formed in the sliding members and configured to restrict movement of the first sliding member in a direction substantially perpendicular to a lengthwise direction of the body housing when the first sliding member is slid in a lengthwise direction of the body housing and to restrict movement of the first and second sliding members when the first and second sliding members are slid in a direction substantially perpendicular to a lengthwise direction of the body housing.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
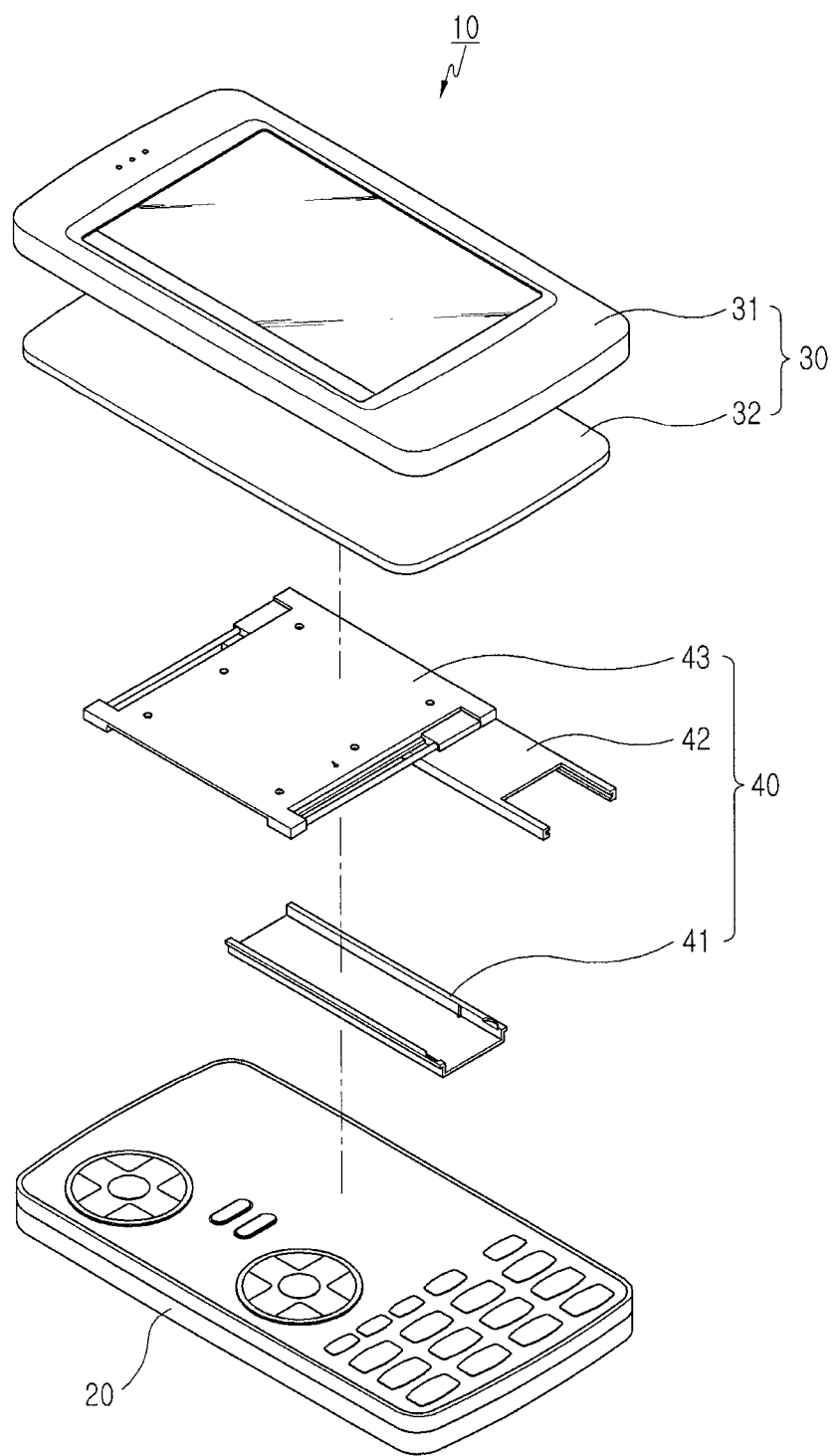
FIG. 1 is an exploded perspective view illustrating a sliding apparatus for a conventional dual slide-type portable communication device.
Figure 2:
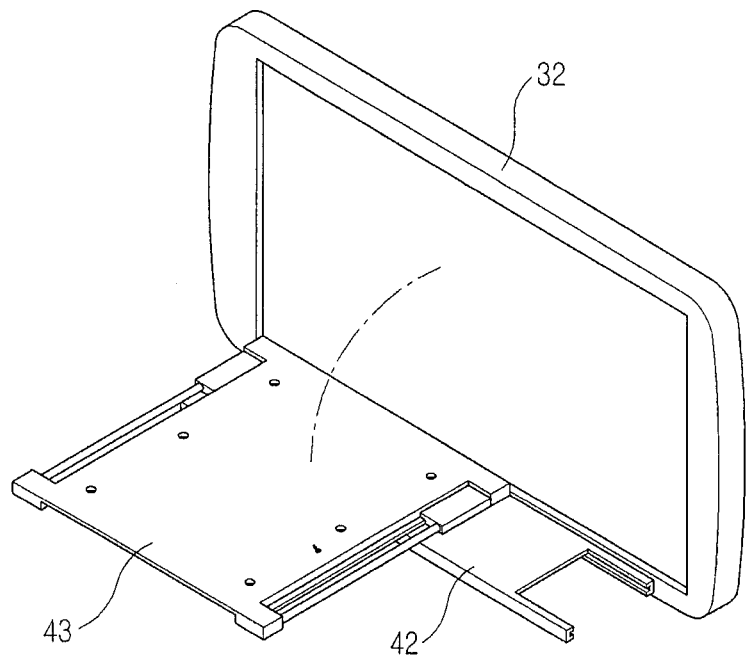
FIG. 2 is a perspective view illustrating a coupling state of the sliding apparatus for a conventional dual slide-type portable communication device.

Hereinafter, an exemplary embodiment of the present invention will be described with reference to the accompanying drawings. It should be understood that since the exemplary embodiment described in the specification and the configurations of the drawings merely describe the most preferred exemplary embodiment of the present invention but do not represent all the technical spirits of the present invention, various modifications by which the exemplary embodiment of the present invention can be made as of the filing date of the application.

As illustrated in FIGS. 3 to 11, a sliding apparatus 100 of a dual slide-type portable communication device including a locking mechanism preferably includes a body housing 20, a sliding housing 30, first, second, and third sliding members 110, 120, and 130, and a locking unit 140. The body housing 20 is slidably coupled to a below-described sliding housing 30 such that the sliding housing 30 can be slid in a lengthwise direction A1 of the body housing 20 or in a direction A2 of the body housing 20 substantially perpendicular to the lengthwise direction A1. The sliding housing 30 is provided on the top surface of the body housing 20 such that the sliding housing can be slid on the body housing 20 in a lengthwise direction A1, or in a direction A2 substantially perpendicular to the lengthwise direction A1. The first sliding member 110 is coupled to the sliding housing 30 such that it is slidably coupled to the below-described second sliding member 120, the first sliding member 110 being slidable in the lengthwise direction A1 of the body housing 20. The second sliding member 120 is stacked on the first sliding member 110 such that the first sliding member 110 can be slid in the lengthwise direction A1 of the sliding housing 30. The third sliding member 130 is stacked on the second sliding member 120 and is coupled to the body housing 20 such that the first and second sliding members 110 and 120 can be slid together in a direction A2 substantially perpendicular to the lengthwise direction A1 of the body housing 20. Preferably, the locking unit 140, which is a type of locking mechanism, is integrally formed with the first and third sliding members 110 and 130 such that the locking unit 140 can restrict sliding movement of the first sliding member 110 in a direction A2 substantially perpendicular to a lengthwise direction A1 of the body housing 20 when the first sliding member 110 is slid in a lengthwise direction A1 of the body housing 20 or can restrict sliding movement of the first and second sliding members 110 and 120 in a lengthwise direction A1 of the body housing 20 when the first and third sliding members 110 and 130 are slid in a direction A2 substantially perpendicular to a lengthwise direction A1 of the body housing 20.

As illustrated in FIGS. 3, 4, 6, 8, 9, and 11, the locking unit 140 includes a locking stopper 141, as well as first and second locking movers 142 and 143. The locking stopper 141 is integrally formed with the third sliding member 130 such that it can contact with the below-described first and second locking movers 142 and 143 while being slid. The first locking mover 142 is integrally formed with the first sliding member 110 such that the first locking mover 142 can be slid together with the first sliding member 110 when the first sliding member 110 is slid in a lengthwise direction A1 of the body housing 20 and can be caught by contact with the locking stopper 141 to restrict movement of the first sliding member 110 in a direction A2 substantially perpendicular to the lengthwise direction A1. The second locking mover 143 is provided in a direction substantially perpendicular to the first locking mover 142 and is integrally formed with the first sliding member 110 such that it can be slid together with the first and second sliding members 110 and 120 when the first and second sliding members 110 and 120 are slid in a direction A2 substantially perpendicular to a lengthwise direction A1 of the body housing 20 and can be caught by contact with the locking stopper 141 to restrict movement of the first and second sliding members 110 and 120.

Figure 6:
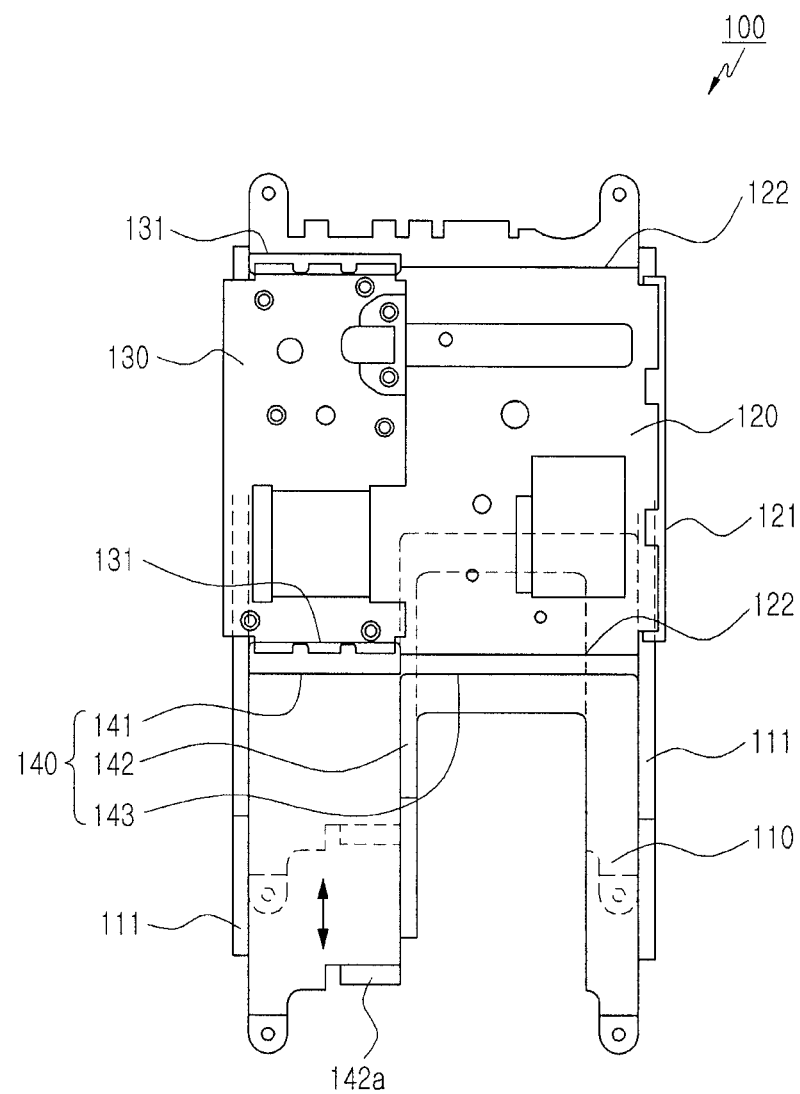
FIG. 6 is a perspective view illustrating a state before the sliding apparatus for a dual slide-type portable communication device according to the exemplary embodiment of the present invention is moved.
Figure 7:
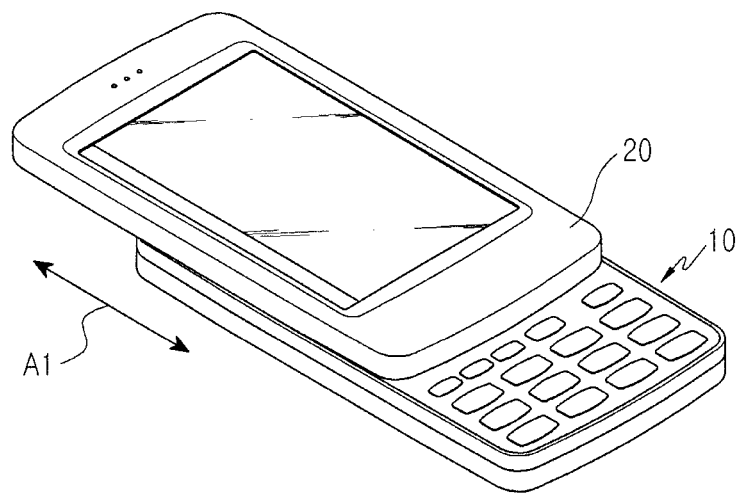
FIG. 7 is a perspective view illustrating a state in which the sliding housing is moved in a lengthwise direction thereof in the sliding apparatus for a dual slide-type portable communication device according to the exemplary embodiment of the present invention.

As illustrated, for example, in FIG. 6, the first and second locking movers 142 and 143 have restricting rails to contact with the locking stopper 141.

Figure 3:
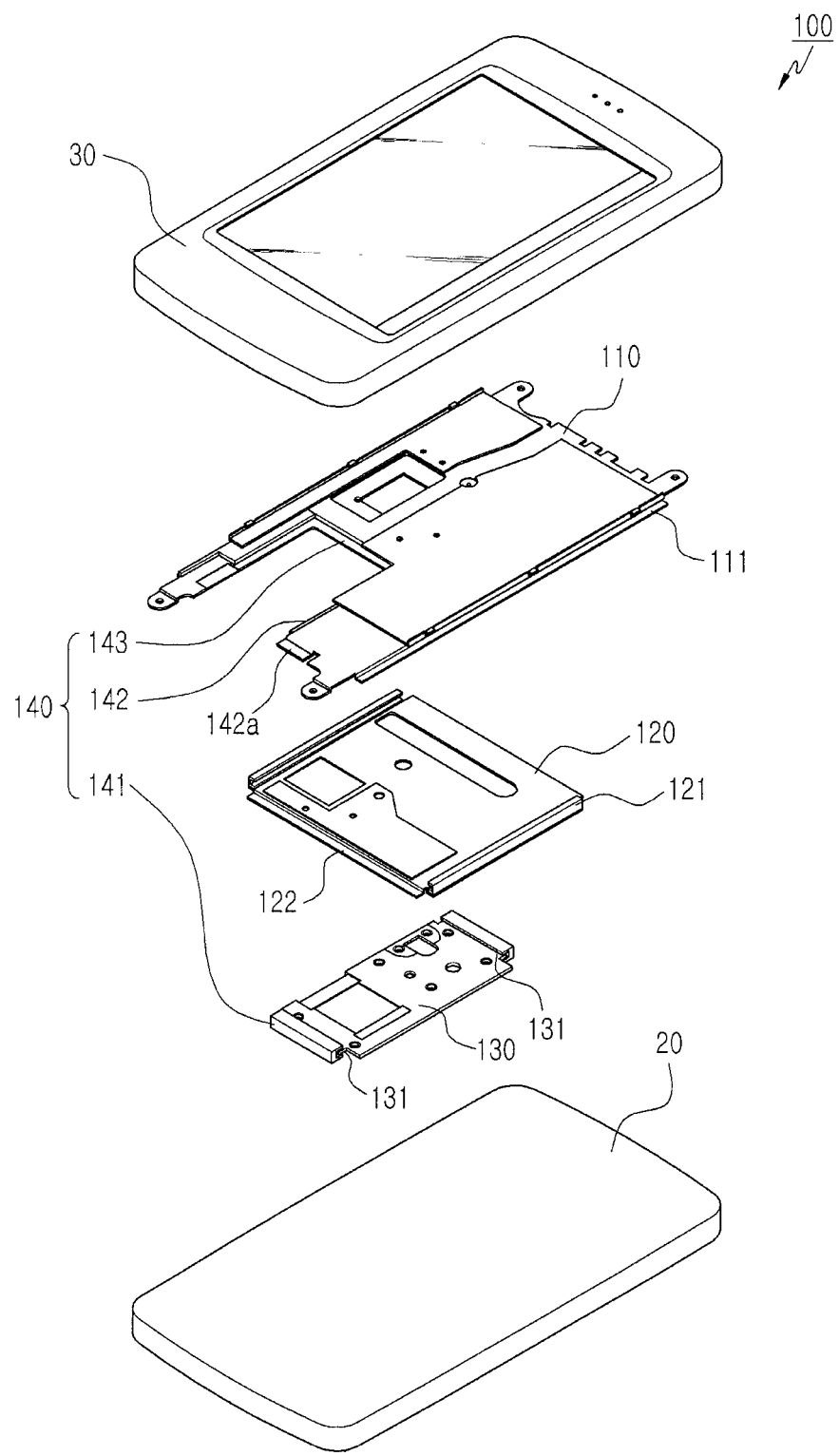
FIG. 3 is an exploded perspective view illustrating a sliding apparatus for a dual slide-type portable communication device including a locking mechanism according to an exemplary embodiment of the present invention.
Figure 4:
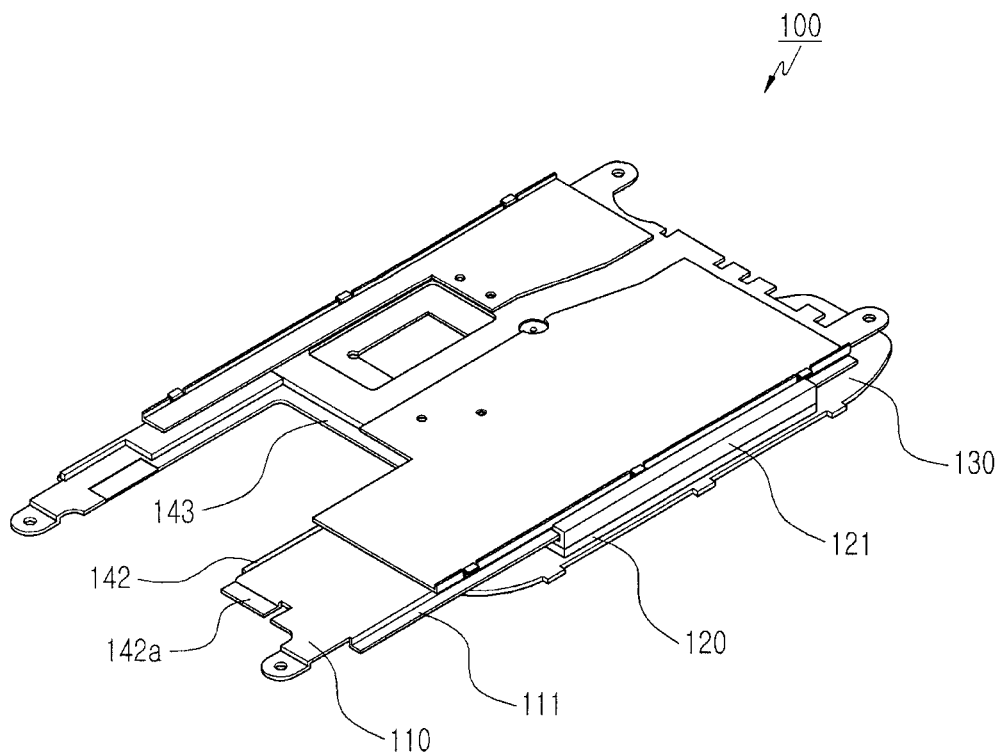
FIG. 4 is a view illustrating a coupling state of the sliding apparatus for a dual slide-type portable communication device according to the exemplary embodiment of the present invention.

As illustrated in FIGS. 3 and 4, a pair of guide rails 111 are formed at opposite ends of the first sliding member 110 along a lengthwise direction A1 of the body housing 20 to be coupled to a below-described first guide 121 so as to be slid in a longwise direction A1 of the body housing 20. The first guide 121 is formed in the second sliding member 120 to be coupled to the guide rails 111 so as to be slid in a lengthwise direction A1 of the body housing 20. A pair of guide rails 122 are formed at opposite ends of the second sliding member 120 along a direction A2 substantially perpendicular to a lengthwise direction A1 of the body housing 20 to be coupled to a below-described second guide 131 so as to be slid in a direction A2 substantially perpendicular to a lengthwise direction A1 of the body housing 20. The second guide 131 is formed in the third sliding member 130 to be coupled to the guide rails 122 so as to be slid in a direction A2 substantially perpendicular to a lengthwise direction A2 of the body housing 20.

As illustrated in FIGS. 3 and 6, the locking stopper 141 is formed in the second guide 131 in order to make contact with the first and second locking movers 142 and 143.

The first and second locking movers 142 and 143 are L-shaped, but are not limited thereto.

Figure 8:
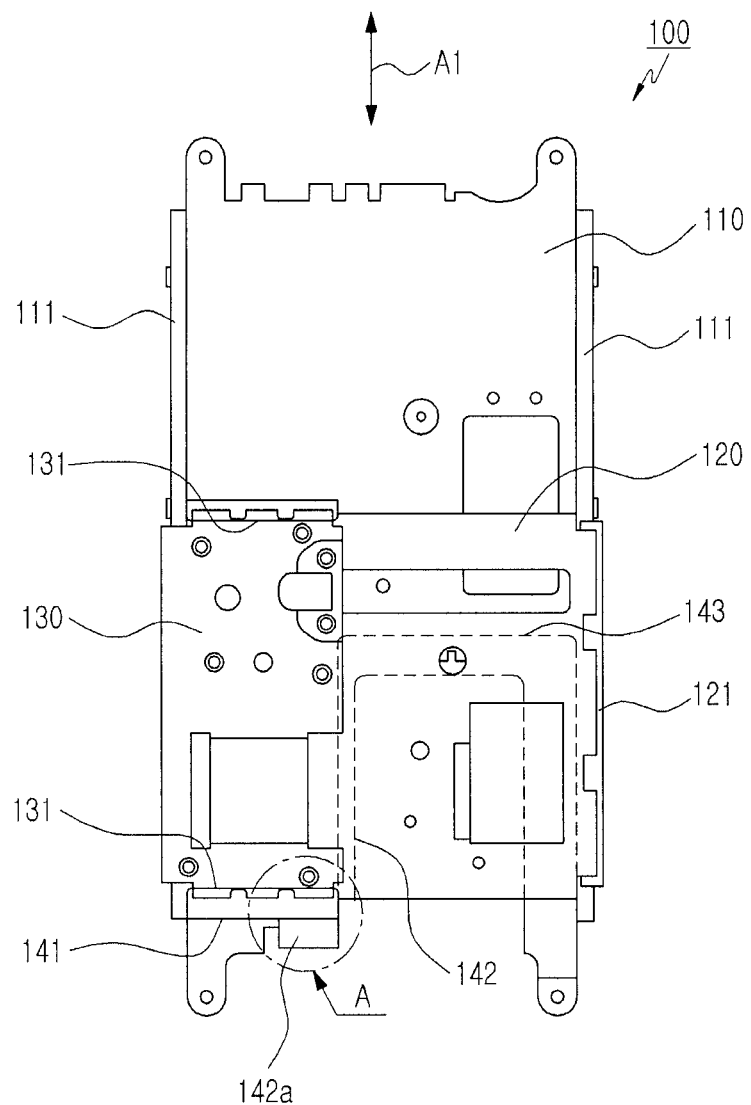
FIG. 8 is a perspective view illustrating a state in which the sliding apparatus for a dual slide-type portable communication device according to the exemplary embodiment of the present invention is moved in a lengthwise direction thereof.
Figure 9:
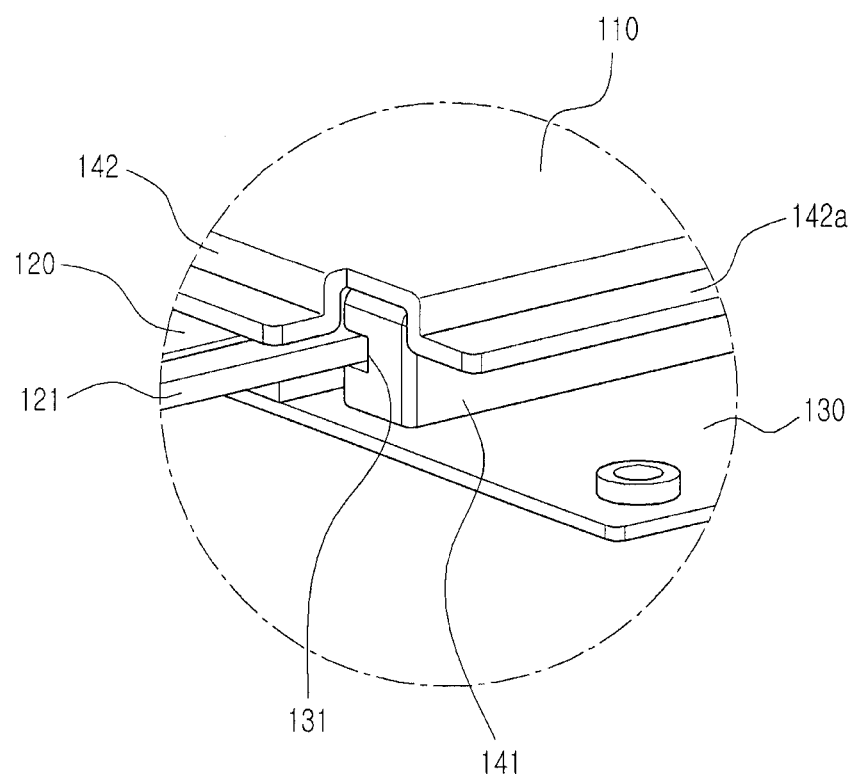
FIG. 9 is an enlarged perspective view of a portion A of FIG. 8.

As illustrated in FIGS. 6, 8, and 9, a contact stopper 142a is formed in the first locking mover 142 to restrict sliding movement of the first locking mover 142 when it contacts with the locking stopper 141 at a position where the sliding movement of the first locking mover 142 ends.

Meanwhile, a mobile communication device has been exemplified as the dual slide-type portable communication device according to this exemplary embodiment of the present invention. However, the dual slide-type portable communication device is not limited to the mobile communication device, but may be applied to various types of devices that can be slidably opened in more than one direction. Some examples of the mobile communication device according to the embodiment of the present invention may include, in addition to all mobile communication terminals based on communication protocols corresponding to various communication terminals, all information communication devices and multimedia devices such as a portable multimedia player (PMP), an MP3 player, a digital broadcasting player, a personal digital assistant (PDA), and a smart phone, and application devices thereof.

Hereinafter, the operation of the sliding apparatus for a dual slide-type portable communication device according to the exemplary embodiment of the present invention will now be described in more detail with reference to FIGS. 3 to 11.

As illustrated in FIGS. 3 and 4, the sliding apparatus 100 for a dual slide-type portable communication device preferably includes the body housing 20, the sliding housing 30, and first, second, and the third sliding members 110, 120, and 130. The first slide member 110 is stacked on the top surface of the second sliding member 120 and is coupled to the second sliding member 120 so as to be slid in a direction A1 of the body housing 20.

The locking unit 140 is a type of locking mechanism.

In this particular state, the third sliding member 130 is provided on the bottom surface of the second sliding member 120 and is slidably coupled to the second sliding member 120.

The third sliding member 130 slides the first and second sliding member 110 and 120 together in a direction A2 substantially perpendicular to a lengthwise direction A1 of the sliding housing (30) when it is slidably coupled to the second sliding member 120.

Then, as illustrated in FIGS. 6 to 11, the locking stopper 141 provided in the third sliding member 130 is installed between the first and second locking movers 142 and 143.

The first and second locking movers 142 and 143 are integrally formed with the first sliding member 110.

The locking stopper 141 is disposed at a position where the first and second sliding members 110 and 120 begin to slide.

The locking stopper 141 is formed in the second guide 131 to contact with the first and second locking movers 142 and 143.

Then, the first sliding member 110 is coupled to the sliding housing 30, and the third sliding member 130 is coupled to the body housing 20.

In this state, as illustrated in FIGS. 3 to 9, when the sliding housing 30 is slid from a starting position to an ending position with respect to the body housing 20 in a lengthwise direction A1 of the body housing 20, the pair of guide rails 111 formed at opposite ends of the first sliding member 110 are slid in the lengthwise direction A1 of the body housing 20 by the first guide 121 formed in the second sliding member 120.

Then, as illustrated in FIG. 6, the first and second locking movers 142 and 143 are slid together in the direction A1 of the body housing 20, and the first locking mover 142 is slid while contacting with the locking stopper 141.

In this way, the first locking mover 142 is caught by contact with the locking stopper 142 and restricts movement of the first sliding member 110 in a direction A2 substantially perpendicular to the lengthwise direction A1 of the body housing 20.

As illustrated in FIGS. 8 and 9, when the first locking mover 142 is moved to a position where its sliding movement in a lengthwise direction A1 of the body housing 20 is ended, since the contact stopper 142a is formed in the first locking mover 142 at the lengthwise ending position and restricts sliding movement of the first locking mover 142 at the lengthwise ending position as the contact stopper 142a makes contact with the locking stopper 141.

Figure 5:
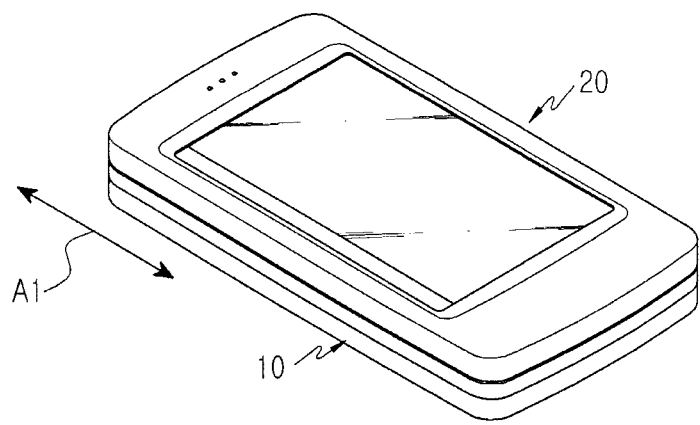
FIG. 5 is a perspective view illustrating a state before a sliding housing is moved in the sliding apparatus for a dual slide-type portable communication device according to the exemplary embodiment of the present invention.

Now referring to FIGS. 5 and 6, when the sliding housing 30 is returned to the original position in a lengthwise direction A1 of the body housing 20, the sliding housing 30 is slid from the ending position to the starting position in the lengthwise direction A1 of the body housing 20 and the first and second locking movers 142 and 243 are also moved. The first locking mover 142 is caught and moved by contact with the locking stopper 141 and restricts movement of the first sliding member 110 in a direction A2 substantially perpendicular to the lengthwise direction A1 of the body housing 20.

Then, as illustrated in FIG. 6, the locking stopper 141 is disposed at the initial position before the first and second sliding members 110 and 120 are slid and is disposed between the first and second locking movers 142 and 144.

Figure 10:
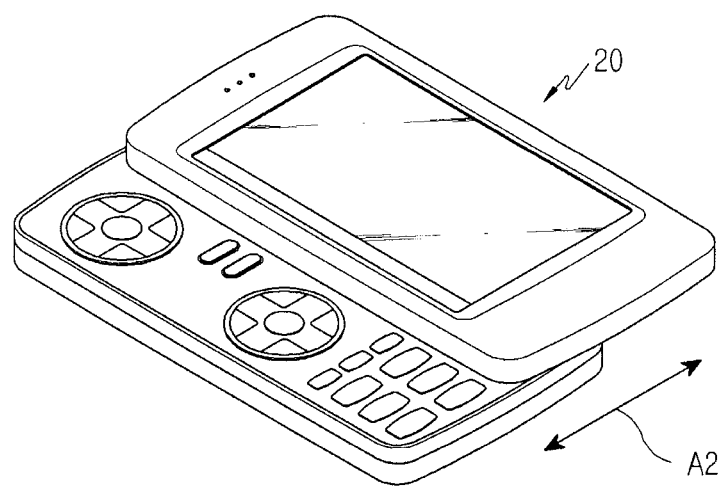
FIG. 10 is a perspective view illustrating a state in which the sliding housing is moved a direction thereof substantially perpendicular to the lengthwise direction in the sliding apparatus for a dual slide-type portable communication device according to the exemplary embodiment of the present invention.
Figure 11:
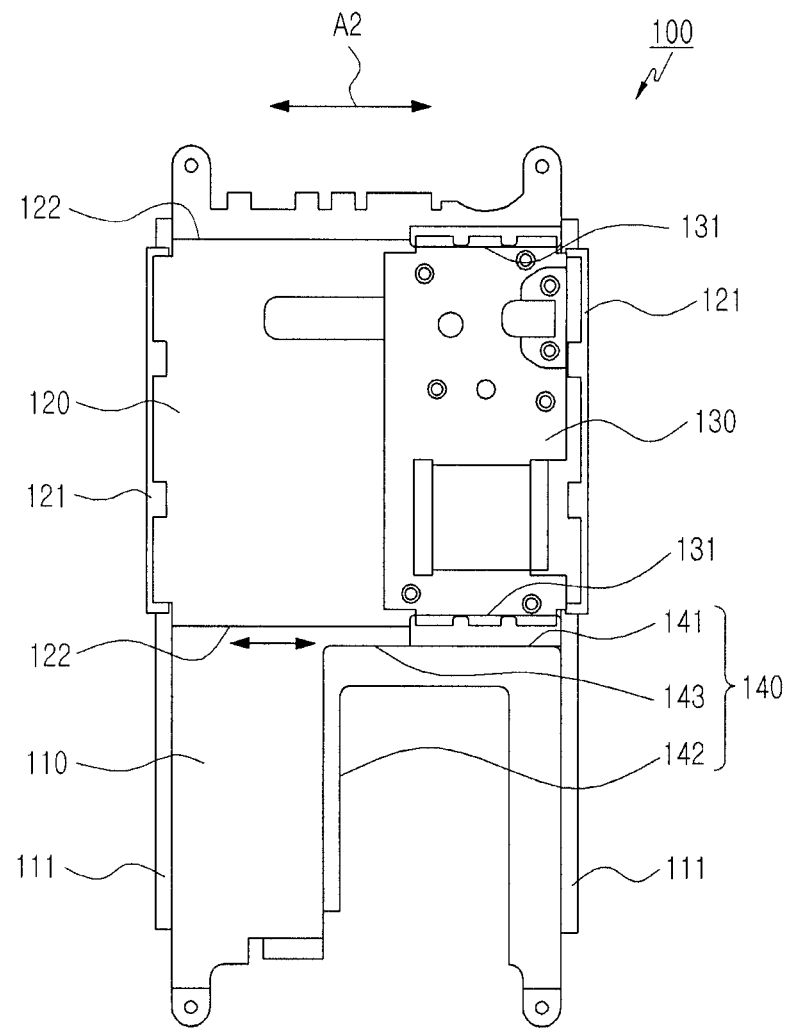
FIG. 11 is a perspective view illustrating a state in which the sliding apparatus for a dual slide-type portable communication device according to the exemplary embodiment of the present invention is moved in a direction thereof substantially perpendicular to the lengthwise direction.

Now referring to FIGS. 10 and 11, when the sliding housing 30 is slid on the body housing 20 from a starting position to a ending position in a direction A2 substantially perpendicular to a lengthwise direction A1 of the body housing 20, the pair of guide rails 122 formed at opposite ends of the second sliding member 120 is slid by the third guide 131 formed in the third sliding member 130 in a direction A2 substantially perpendicular to a lengthwise direction A1 of the body housing 20.

Then, as illustrated in FIG. 11, the first and second locking movers 142 and 143 are also slid together in a direction A2 substantially perpendicular to a lengthwise direction A1 of the body housing 20, and the second locking mover 143 is slid while contacting with the locking stopper 141.

In this way, the second locking mover 143 is caught by contact with the locking stopper 141 and restricts movement of the first and second sliding members 110 and 120 in a lengthwise direction A1 of the body housing 20. Accordingly, movement of the sliding housing 30 coupled to the first sliding member 110 in the lengthwise direction A1 of the body housing 20 is restricted.

Referring again to FIG. 5, when the sliding housing 30 is returned to the original position in a direction A2 substantially perpendicular to a lengthwise direction A1 of the body housing 20, the sliding housing 30 is slid from the ending position to the starting position in the direction A2 substantially perpendicular to a lengthwise direction A1 of the body housing 20 and the first and second locking movers 142 and 142 are also moved together. The second locking mover 143 is caught and moved by contact with the locking stopper 141 and restricts movement of the first and second sliding members 110 and 120 in a lengthwise direction A1 of the body housing 20.

Then, the locking stopper 141 is disposed at the initial position of the first and second sliding members 110 and 120 and is also disposed between the first and second locking movers 142 and 143.

It will be understood by those skilled in the art that a sliding apparatus for a dual slide-type portable communication device including a locking unit according to the present invention is not limited by the above-described exemplary embodiment and drawings, as various changes in form and details may be made therein without departing from the spirit and scope of the invention as defined by the appended claims.

What is claimed is:

1. A sliding apparatus for a dual slide-type portable communication device in which a body housing and a sliding housing are configured for sliding along the body housing in a lengthwise direction of the body housing, or in a direction substantially perpendicular to the lengthwise direction of the body housing, the sliding apparatus comprising:
a first sliding member coupled to a sliding housing;
a second sliding member stacked onto the first sliding member and configured to slide the first sliding member along the lengthwise direction of the body housing;
a third sliding member stacked onto the second sliding member and configured to slide the first and second sliding members together along a direction substantially perpendicular to the lengthwise direction of the body housing; and
a locking unit integrally formed in the sliding members and configured for restricting movement of the first sliding member in the direction substantially perpendicular to the lengthwise direction of the body housing when the first sliding member is slid in the lengthwise direction of the body housing, and for restricting movement of the first and second sliding members in the lengthwise direction of the body housing when the first and second sliding members are slid in the direction substantially perpendicular to the lengthwise direction of the body housing, wherein the locking unit includes:
a locking stopper formed in a guide along a lower edge of the third sliding member transverse to the lengthwise direction of the body housing to be in contact with the first and second sliding members and restrict movement of the first and second sliding members together beyond a predetermined point in the direction substantially perpendicular to the lengthwise direction of the body housing,
wherein the locking unit includes:
the locking stopper being integrally formed with the third sliding member;
a first locking mover integrally formed with the first sliding member and configured for sliding together with the first sliding member when the first sliding member slides in the lengthwise direction of the body housing and configured to contact with the locking stopper for preventing the movement of the first sliding member beyond the predetermined point in the direction substantially perpendicular to the lengthwise direction of the body housing; and
a second locking mover integrally formed with the first sliding member and provided in the direction substantially perpendicular to the first locking mover, the second locking mover being configured for sliding together with the first and second sliding members when the first and second sliding members are slid in the direction substantially perpendicular to the lengthwise direction of the body housing, and to contact with the locking stopper for restricting movement of the first and second sliding members in the lengthwise direction of the body housing.

2. The sliding apparatus as claimed in claim 1, wherein the first and second locking movers include restricting rails.

3. The sliding apparatus as claimed in claim 1, wherein a pair of guide rails are formed at ends of the first sliding member along the lengthwise direction of the body housing and a first guide coupled to the guide rails and configured for sliding in the lengthwise direction of the body housing is formed in the second sliding member.

4. The sliding apparatus as claimed in claim 1, wherein a pair of guide rails are formed at ends of the second sliding member along the direction substantially perpendicular to the lengthwise direction of the body housing and a second guide coupled to the guide rails and configured for sliding in the direction substantially perpendicular to the lengthwise direction of the body housing is formed in the third sliding member.

5. The sliding apparatus as claimed in claim 4, wherein the locking stopper is formed in the second guide to contact with the first locking mover and second locking mover.

6. The sliding apparatus as claimed in claim 1, wherein the first locking mover and second locking mover are L-shaped.

7. The sliding apparatus as claimed in claim 1, wherein a contact stopper is formed in the first locking mover and configured to contact with the locking stopper at a sliding movement ending position to restrict sliding movement of the first locking mover.

8. A sliding apparatus for a dual slide-type portable communication device comprising:
a first sliding member adapted for coupling to a sliding housing;

a second sliding member stacked onto the first sliding member and configured to slide the first sliding member along a lengthwise direction of the portable communication device;

a third sliding member stacked onto the second sliding member and configured to slide the first and second sliding members together along a direction substantially perpendicular to the lengthwise direction of the portable communication device; and a locking unit selectively formed in the sliding members and configured for restricting movement of the sliding members in a direction substantially perpendicular to the lengthwise direction of the portable communication device when the sliding members are moved in the lengthwise direction of the portable communication device, and for restricting movement of the sliding members in the lengthwise direction of the portable communication device when the sliding members are moved in a direction substantially perpendicular to the lengthwise direction of the portable communication device, wherein the locking unit includes:

a locking stopper formed in a guide along a lower edge of the third sliding member transverse to the lengthwise direction of the body housing to be in contact with the first and second sliding members and restrict movement of the first and second sliding members together beyond a predetermined point in the direction substantially perpendicular to the lengthwise direction of the body housing, and further comprising the locking stopper being integrally formed with the third sliding member;

a first locking mover integrally formed with the first sliding member and configured for sliding together with the first sliding member when the first sliding member slides in the lengthwise direction of the body housing and configured to contact with the locking stopper for restricting movement of the first sliding member in the direction substantially perpendicular to the lengthwise direction of the body housing; and a second locking mover integrally formed with the first sliding member and provided in the direction substantially perpendicular to the first locking mover, the second locking mover being configured for sliding together with the first and second sliding members when the first and second sliding members are slid in the direction substantially perpendicular to a lengthwise direction of the body housing, and to contact with the locking stopper for restricting movement of the first and second sliding members in the lengthwise direction of the body housing.

* * * * *